Nov. 1, 1949    F. L. KOENIG    2,436,748
SLIDE RULE

Filed Jan. 3, 1945    2 Sheets-Sheet 1

Inventor
Francis L. Koenig

By Stevens and Davis
Attorneys

Nov. 1, 1949    F. L. KOENIG    2,486,748
SLIDE RULE
Filed Jan. 3, 1945    2 Sheets-Sheet 2

Inventor
Francis L. Koenig

By Stevens and Davis
Attorneys

Patented Nov. 1, 1949

2,486,748

UNITED STATES PATENT OFFICE 2,486,748

SLIDE RULE

Francis L. Koenig, Arlington, Va.

Application January 3, 1945, Serial No. 571,127

9 Claims. (Cl. 235—70)

1

This invention relates to rules and is illustrated as a combined measuring and slide rule for architects, engineers, etc., which is designed to take the place of the two rules commonly required. My improved rule is adapted to be carried in the pocket, and has features especially designed for such purpose. It not only presents the advantages arising from obviating the necessity of carrying two rules, but gives all of the features and advantages of the rules presently used and also present advantages over the type of rules presently used aside from the saving in space due to the elimination of one rule. Furthermore, the design has important advantages in features of construction allowing the rule to be fabricated by methods much more economical than those employed in conventional rules either of the slide rule type or of the measuring type.

One of the objects therefore of my invention is the provision of new methods of manufacturing rules, whether of the slide rule type or of the measuring type.

Further objects of my invention are the provision of a cursor or runner for a slide rule and the provision of a sliding bar each arranged to be resiliently held in place by its own resilience.

A further object of my invention is the provision of grooves so formed in the body of the rule to cooperate with a resilient runner or cursor, that the cursor is held resiliently in place with the proper amount of friction to prevent it from sliding.

Another object of my invention is the provision of means and methods whereby the cursor or runner of the slide rule may be countersunk into the surface thereof in order to eliminate the bulge ordinarily occasioned thereby.

A feature of my invention is the incorporation in a single rule of means for conveniently measuring various objects, together with means for computing on the slide rule principle.

Further objects and features of my invention will be apparent from a reading of this specification in connection with the accompanying drawings, in which.

Figure 1:
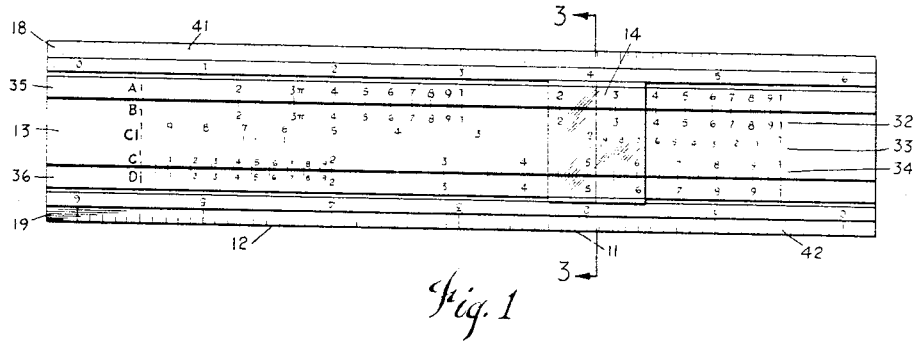
Figure 1 is a top plan view of one form of slide rule constructed according to my invention.
Figure 2:
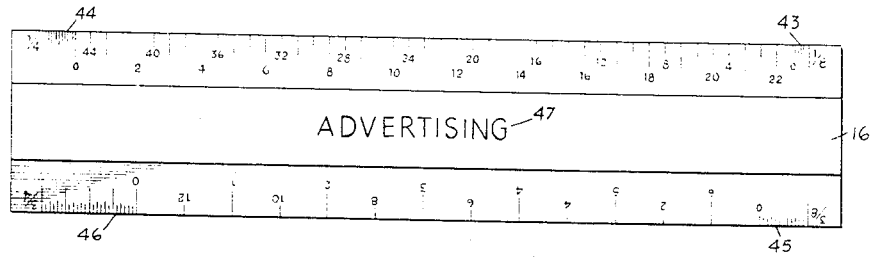
Figure 2 is a bottom plan view of the slide rule shown in Figure 1.
Figure 4:
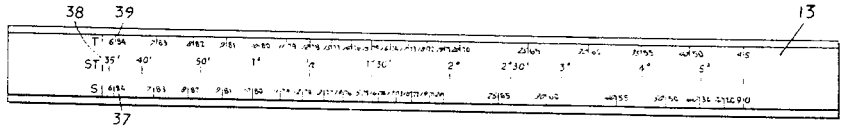
Figure 4 is a bottom plan view of the running bar of the rule of Figure 1 shown removed therefrom.
Figure 3:
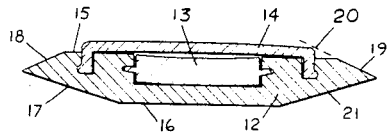
Figure 3 is an enlarged sectional view of the slide rule of Figure 1 taken substantially on the line 3—3 of Figure 1.

Referring in detail to the drawings, it may be seen that I have shown in Figures 1, 2 and 3 a slide rule generally designated as 11, having a main body 12, a running bar 13 and an indicating member comprising a cursor or runner 14. The body 12 is formed with an upper horizontal flat face 15 and a lower horizontal flat face 16 and with inclined faces 17, 18, 19 and 21. It is formed with a runway 22 (see Figure 7) designed to receive the running bar 13. The runway 22 is provided with grooves 23 and 24 arranged to receive projections 25 and 26 formed on the running bar 13. It is also formed extending throughout its length with a pair of grooves 27 and 28 arranged to receive the lower enlarged ends or prolongations 29 and 31 (see Figure 5) of the cursor 14. The upper face of the running bar 13 is provided with B, C1 and C scales designated respectively 32, 33 and 34. These scales are arranged to cooperate at times with scales A and D formed on the upper flat face 15 of the rule 12 and respectively designated as 35 and 36. The lower face of the running bar 13 is provided with S, ST and T scales also arranged to cooperate with the scales A and D, which are numbered respectively 37, 38 and 39.

Figure 5:
Figure 5 is an end view of the cursor of Figure 1 shown removed from the rule.
Figure 7:
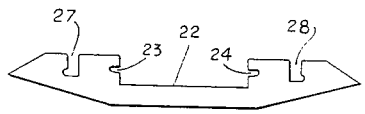
Figure 7 is an enlarged end view of the main body of the rule of Figure 1, shown with the cursor and the running bar removed.

As may be seen by a comparison of Figure 5 with Figure 7 the cursor 14 is longer than the distance between the grooves 27 and 28. Thus it has to be compressed slightly in order to be inserted in the grooves with the result that it is bowed slightly as may be seen in Figure 3 and is thus held in place wherever moved by its own resilience.

Figure 6:
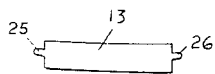
Figure 6 is an enlarged end view of the running bar of Figure 1 shown removed from the rule.

The upper and lower faces of the running bar 13 are bowed slightly as may be seen by viewing Figures 3 and 6 from the side so that the natural resiliency of the bar causes such faces to press against the lower surface of the groove 22 of the main rule member 12 and the upper surfaces of the projections 25 and 26 to press against the upper portions of the grooves 23 and 24, so that the running bar is resiliently held by friction in positions to which it is moved during operation of the slide rule.

On the surface 18 there is provided a series of markings 41, and on the surface 19 there is provided a series of markings 42. The markings 41 enable the user to measure in inches by sixteenths, the series 42 enable the user to measure in inches by tenths. On the surface 21 there are provided a pair of series of markings 43 and 44. The series 44 enables the user to measure by quarter inches, and the series 43 enables the user to measure by eighths. On the surface 17 there are provided two series of markings designated 45 and 46. The series 46 enables the user to measure by three-quarter inches and the series 45 enables the user to measure by three-eighths inches.

Figure 8:
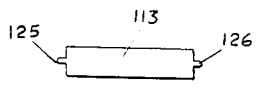
Figure 8 is an enlarged end view of an alternate form of running bar.

In the modification shown in Figure 8, the running bar 113 has its upper and lower surfaces formed flat. In the modification shown in Figures 9, 10 and 11 the end 61 of the rule 212 is provided with a cut-out portion or pocket 62 and with a hole 63. The grooves 227 and 228 are formed adjacent to this cut-out portion with deeper and wider indentations 64 and 65. The running bar 213 does not extend to the end of the rule nor do the slide rule markings 235 and 236. Thus, the cursor or slider 214 may be dropped into the position shown in full lines in Figure 10 in which its upper surface is flush with the top of the slide rule and the whole structure may fit easily and comfortably in the pocket of the wearer without creating any troublesome bulges and without inconveniencing the user. Because the grooves 64 and 65 are wider than the grooves 227 and 228 the cursor 214 is allowed to extend when dropped into the grooves 64 and 65 from its bowed form to a flat form as shown in Figure 10. Stops 66 are provided adjacent the end of the rule to prevent the cursor 214 from moving out of the grooves 64 and 65. It is to be noted, however, that the markings 241 and 242 as well as markings corresponding to markings 43, 44, 45 and 46 extend substantially throughout the length of the rule.

One of the important features of my invention is the method of forming rules constructed according to my invention. The elements may if desired be formed of wood or metal or formed of plastic and baked in molds. Preferably, however, I form my improved rules either of extruded plastic as now to be described or of pressure injection molded plastic as described below in connection with the form illustrated in Figures 9-11. Referring to the various parts of the rules shown in Figures 1-8, inclusive, it may be seen that each element is of uniform cross-section throughout its length. Elements may, therefore, be extruded of plastic material, the runner or cursor being formed of a clear transparent plastic while the main bar and running bar may be formed either of clear transparent plastic or opaque, white or other colored plastic. After extrusion the main bar should be marked with the indications 35, 36, 41, 42, 43, 44, 45, 46 and the running bar marked with the indications 32, 33, 34, 37, 38 and 39 as by etching or engraving, or by other similar method of marking. After the main bar and the running bar have been marked, the rule is assembled by sliding the running bar into the main bar from one end and then bowing the cursor slightly and sliding the projections 29 and 31 thereof into the grooves 28 and 27 from one end. As stated above, the cursor 14 is slightly wider in its unsprung condition, as shown in Figure 5, than the grooves 27 and 28, so that when positioned in the grooves 27 and 28 the projections of the cursor resiliently press against the outside of the grooves and thus the cursor is resiliently held in any position in which it is placed. To this end it may be noted that the outside edges of the grooves 27 and 28 are inclined slightly outward to fit the inclined edges of the projections 31 and 29 of the cursor 14 when the cursor is bowed and in position, as in Figure 3.

Figure 9:
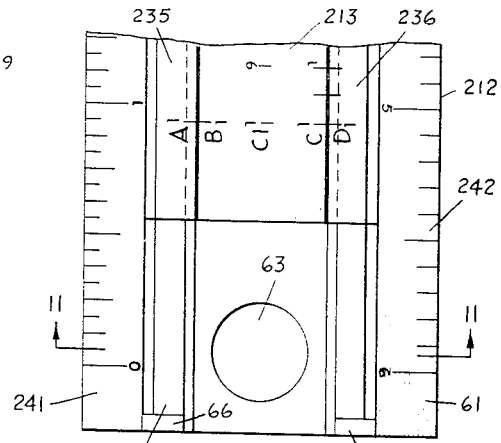
Figure 9 is a fragmentary enlarged view of one end of an alternate form of rule constructed according to my invention.
Figure 10:
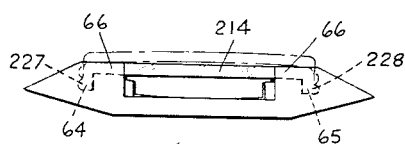
Figure 10 is an enlarged end view of the alternate form of rule shown in Figure 9.
Figure 11:
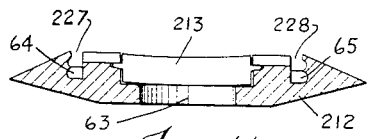
Figure 11 is a section taken substantially on the line 11—11 of Figure 9.

The form of my invention illustrated in Figures 9-11 may be made in various ways, but I prefer to make the body portion 212 of pressure injection molded plastic with the divisions, lettering, etc., cast in the mold, so that the cut-out portion 62 and the stops 66 may be more easily formed. The running bar 213 and cursor 214 should preferably be formed of extruded plastic as the similar parts of the embodiment shown in Figures 1-8 are preferably formed. Because of the stops 66 the cursor 214 is assembled into the main body only from the opposite end.

In the operation or use of my improved rule the user uses the slide rule portion in the normal way by moving the runner bar 13, so that indications on the scales A and D coincide with selected indications on the scales 32, 33, 34, 37, 38 and 39 as desired, using the cursor 14 to mark positions on the main bar 12 for subsequent computations by the running bar 13. The bow of the running bar 13 resiliently holds it in place at any position to which it is moved, by friction at the lower portion of the running bar against the indentation 22 and the upper faces of the projections 25 and 26 against the upper faces of the grooves 23 and 24. The resilient spring of the cursor 14 holds it in any position to which it is moved by the outward press of the projections or prolongations 29 and 31 against the grooves 28 and 27.

In using the rule for measuring, the user inclines the rule slightly so that the sharp edge between the surfaces 17 and 18 and between the surfaces 19 and 21 may be brought close to the object being measured. It is to be especially noted that the upward projection of the faces 18 and 19 just clears the upper edge of the cursor 14, as may be seen from the dotted line 20 in Figure 3. The face 16 may be used for advertising purposes as is indicated by the word "advertising" designated by the numeral 47 in Figure 2.

I have shown merely for the purpose of illustration certain specific scales designated as 32-39, inclusive, on the slide rule portion of the rule illustrated, and I have shown also merely for purpose of illustration, certain specific scales 41-46, inclusive, on the measuring portion of the rule. I of course intended that I may substitute for the specific scales shown, other scales to meet the needs of other users, there being a wide variety of different scales used in different slide rules for various purposes and being a wide variety of measuring scales used in measuring rules for various purposes. I have described my improved slide rule as made of plastic. Other materials may be used in fabricating a rule according to my invention.

I have set out in detail a specific method of fabricating my improved slide rule. In certain cases I may desire to use other methods of fabricating the rule. It is to be understood, therefore, that the above suggested modifications and other modifications of my invention may be made without departing from the spirit and scope of my invention, except as limited by the following claims.

I claim:

1. A slide rule comprising a unitary body member formed with a pair of grooves on its face, extending longitudinally thereof substantially from one end to the other, and a cursor formed of transparent plastic having projections formed thereon arranged to be positioned within the grooves and resiliently urged by the shape of the cursor itself into contact with the outer edges of said grooves, one of the grooves being formed adjacent each side of the body member and each groove being enlarged at its base throughout its length.

2. A rule comprising a unitary body member formed with a central runway extending longitudinally of the body member from end to end and formed with a set of longitudinally extending grooves extending from end to end of the unitary body member and positioned outwardly from said runway, a sliding bar positioned in said runway, and an indicating member having downwardly extending projections positioned in said set of grooves, one of the grooves being formed adjacent each side of the body member and each groove being enlarged at its base throughout its length.

3. A rule comprising a body member formed of plastic having an upper horizontal face and a lower horizontal face and having a pair of lower inclined faces and a pair of upper inclined faces, the upper and lower inclined faces having indicia thereon and the upper horizontal face being provided with slide rule markings, a slide in the said horizontal face, said slide having markings thereon for cooperating with the first said markings said body also having a pair of longitudinally extending grooves in the upper horizontal face extending from end to end of the body, and an indicating member having downwardly extending projections positioned in said grooves, one of said grooves being formed adjacent to each side of the body member and each groove being enlarged at its base throughout its length for interlocking with the projections of the indicating member.

4. A rule constructed in accordance with claim 1 in which the cursor is formed of clear resilient plastic and has an overall length when disassembled greater than the distance between said grooves.

5. A rule comprising a body member formed with a central runway provided with lateral grooves extending longitudinally of the body member from end to end and formed with a second set of grooves longitudinally extending from end to end of the body and positioned outwardly from said runway, a sliding bar positioned in said runway and formed with projections received within said first named grooves, and a cursor having downwardly extending projections positioned in said second set of grooves, with its projections being formed with anchoring means thereon to retain the cursor in position upon the body member.

6. A slide rule comprising a body member formed with longitudinally extending spaced grooves in its upper face, and with the upper and lower faces having inclined surfaces tapering to an edge and forming the outer boundaries of the rule, and said body member also having a central runway formed in the upper face between the grooves; a slide positioned in said runway, cooperating scales being provided on said body and slide; and a cursor overlying the slide when in operative position and cooperating with said scales, said cursor having prolongations interlocking in said grooves, the inclined faces being disposed at such angles that line projections thereof do not intersect the cursor and the body.

7. A rule comprising a unitary body member formed with scales and with a central runway extending longitudinally of the body member from end to end and formed with a set of longitudinally extending grooves in the upper face thereof, extending from end to end of the unitary body member and positioned outwardly from said runway; a sliding bar formed with scales and positioned in said runway; and a cursor having downwardly extending prolongations positioned in said set of grooves; the body member also having a pocket adjacent to one end of the body member and beyond the end of the scale portion of said body member, and being adapted to receive the cursor.

8. A rule comprising a unitary body member formed with scales and with a central runway extending longitudinally of the body member from end to end and formed with a set of longitudinally extending grooves in the upper face thereof, extending from end to end of the unitary body member and positioned outwardly from said runway; a sliding bar formed with scales arranged to cooperate with the scales of the body member and positioned in said runway; and an indicating member having downwardly extending prolongations positioned in said set of grooves; the body member also having a pocket adjacent to one end of the rule and said grooves formed with a portion having a greater depth adjacent to said pocket into which the prolongations of the indicating member may be lowered so that the indicating member may be out of the way when the rule is not in use.

9. A rule comprising a body member formed of extruded plastic having parallel upper and lower faces and having a pair of lower inclined marginal faces and a pair of upper inclined marginal faces, the upper and lower inclined faces being provided with measuring indications and the upper face being provided with slide rule markings, said body member being formed with a central runway having lateral grooves in the walls thereof, the central runway extending longitudinally of the body member from end to end, said body member being also formed with a pair of longitudinal grooves extending from end to end thereof and positioned outwardly from said runway and adjacent to the line of intersection of the upper inclined faces and the respective side edges of the upper face of the body member, a slide having slide rule markings positioned in said runway and formed with projections, said projections being positioned within the said first named grooves, and a transparent cursor having downwardly extending projections positioned in and anchored in said second set of grooves, said cursor being formed and positioned with respect to the body member so that a continuation of the planes of the upper inclined faces passes above the cursor.

FRANCIS L. KOENIG.

REFERENCES CITED

The following references are of record in the file of this patent:

UNITED STATES PATENTS

| Number | Name | Date |
|---|---|---|
| 732,072 | Haskell et al. | June 30, 1903 |
| 747,098 | Stanley | Dec. 15, 1903 |
| 854,325 | Belcher | May 21, 1907 |
| 1,021,484 | Richardson | Mar. 26, 1912 |
| 1,181,672 | Keuffel | May 2, 1916 |
| 1,249,049 | Eifel | Dec. 4, 1917 |
| 1,459,857 | Parsons | June 26, 1923 |
| 1,461,975 | Eaton et al. | July 17, 1923 |
| 1,659,739 | Kuhlman | Feb. 21, 1928 |
| 1,875,927 | Keuffel | Sept. 6, 1932 |

FOREIGN PATENTS

| Number | Country | Date |
|---|---|---|
| 580,985 | France | Sept. 16, 1924 |
| 571,181 | Germany | July 27, 1933 |
| 413,308 | Great Britain | July 9, 1934 |

OTHER REFERENCES

Page 102 of vol. 7, 1945, #26 Plastics Bulletin, published by Plastics Department of Dupont Co., at Arlington, N. J.